(12) United States Patent
Hoyle et al.

(10) Patent No.: US 12,116,844 B2
(45) Date of Patent: Oct. 15, 2024

(54) TILING FOR DOWNHOLE TOOL

(71) Applicant: Schlumberger Technology Corporation, Sugar Land, TX (US)

(72) Inventors: David C. Hoyle, Salt Lake City, UT (US); Scott S. Dahlgren, Alpine, UT (US); David R. Hall, Provo, UT (US); Malcolm R. Taylor, Aberdeen (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 17/099,816

(22) Filed: Nov. 17, 2020

(65) Prior Publication Data

US 2021/0148406 A1 May 20, 2021

Related U.S. Application Data

(60) Provisional application No. 62/937,346, filed on Nov. 19, 2019.

(51) Int. Cl.
*E21B 10/22* (2006.01)
*F16C 33/04* (2006.01)

(52) U.S. Cl.
CPC ............ *E21B 10/22* (2013.01); *F16C 33/043* (2013.01)

(58) Field of Classification Search
CPC ...... E21B 10/22; E21B 17/05; E21B 2200/01; F16C 17/00
See application file for complete search history.

(56) References Cited

U.S. PATENT DOCUMENTS

| | | |
|---|---|---|
| 4,732,364 A | 3/1988 | Seger et al. |
| 5,364,192 A | 11/1994 | Damm et al. |
| 6,234,261 B1 | 5/2001 | Evans et al. |
| 7,343,968 B2 | 3/2008 | Kubala |
| 7,926,597 B2 | 4/2011 | Majagi et al. |
| 8,522,899 B2 | 9/2013 | Bouaphanh |
| 8,528,667 B2 | 9/2013 | Bouaphanh |
| 9,347,484 B2 | 5/2016 | Cooley et al. |
| 2014/0241654 A1* | 8/2014 | Cooley .................. F16C 17/08 384/420 |
| 2015/0152914 A1* | 6/2015 | Gonzalez ................ E21B 10/00 384/284 |
| 2017/0216961 A1* | 8/2017 | Utter ..................... B21K 25/005 |

* cited by examiner

*Primary Examiner* — Caroline N Butcher
(74) *Attorney, Agent, or Firm* — SLB IP. Dept.

(57) ABSTRACT

Interfacing surfaces of adjacent tiles in a downhole tool may combine to form a tortuous path therebetween. In various embodiments, this tortuous path may run generally parallel and/or perpendicular to a top surface of the tiles. One example of such a tortuous path may be created by a protrusion extending from an interfacing surface of one of the tiles that may fit snugly within a cavity receding into an interfacing surface of another of the tiles.

20 Claims, 5 Drawing Sheets

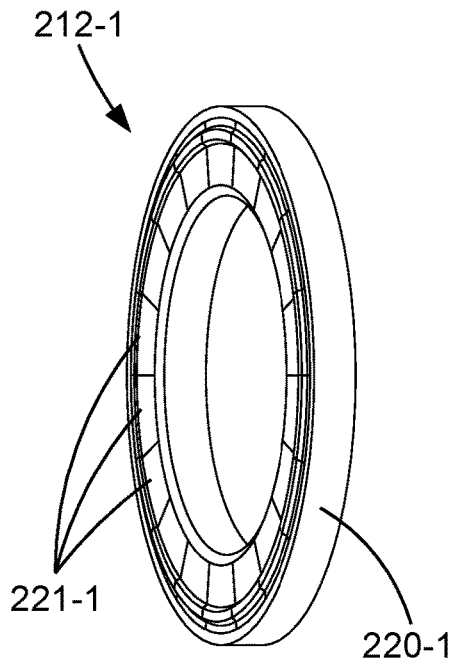
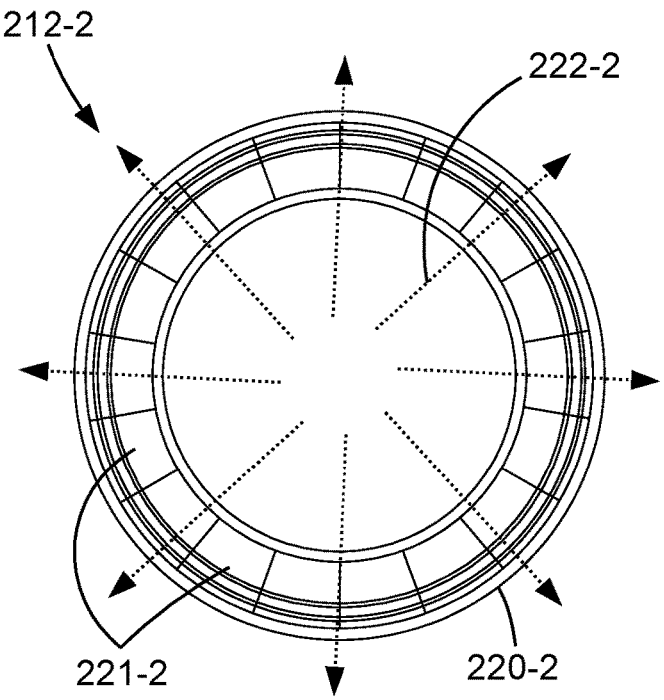
Fig. 2-1
Fig. 2-2
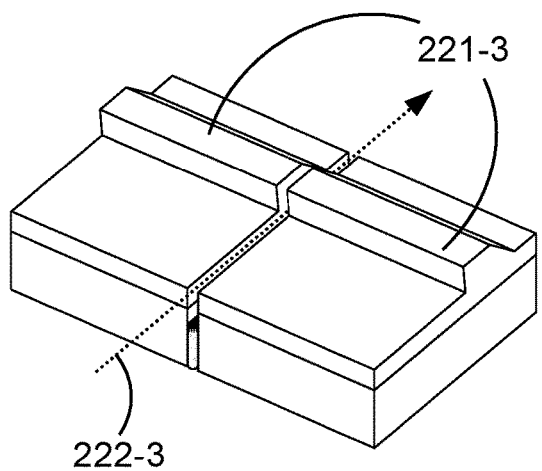
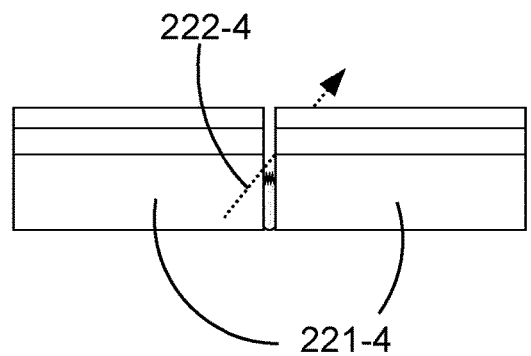
Fig. 2-3
Fig. 2-4

TILING FOR DOWNHOLE TOOL

CROSS REFERENCE TO RELATED APPLICATIONS

This application claims priority to and the benefit of U.S. Prov. Pat. App. No. 62/937,346 entitled "Erosion-Resistant Tiling" and filed Nov. 19, 2019 which is incorporated herein by reference its entirety.

BACKGROUND

FIG. 1 shows an embodiment of a washpipe seal assembly. Such an assembly may allow a pressurized abrasive fluid 105 to flow between a non-rotating conduit member 110 and a rotating conduit member 111. To retain the fluid 105 within the assembly, a floating seal ring 112, mounted to the non-rotating conduit member 110, may engage a rotating seal ring 113, mounted to the rotating conduit member 111, via an annular projection 118 extending outwardly from the floating seal ring 112. Such a floating seal ring 112 and rotating seal ring 113 may each comprise a ceramic ring 114, 115 mounted within a respective steel ring 116, 117 via heat shrink. Each steel ring 116, 117 may prestress its respective ceramic ring 114, 115 in compression such that it may handle high internal pressures. While the use of ceramic material is intended to resist excessive abrasion between the floating seal ring 112 and rotating seal ring 113, wear does still occur in practice leading to fluid leaks 106 between the rings 112, 113.

To enhance the abrasion resistance of such rings, beyond the typical properties of ceramic materials such as silicon carbide, an advanced superhard material (i.e. material comprising a Vickers hardness test result exceeding 40 gigapascals) such as polycrystalline diamond or cubic boron nitride may be used. The size of such superhard materials may be limited, however, by the physical constraints of the high-pressure, high-temperature equipment traditionally used to synthesize these materials. To manufacture a ring of sufficient size to use with a washpipe seal assembly as just described, it may be desirable to mate several pieces of superhard material into a single part.

It is common for tool surfaces exposed to repeated rubbing (e.g., bearings) or abrasive fluid flow to be clad in specialized materials, especially superhard materials, to enhance their resistance to erosion. Cladding of this kind may be applied in a variety of ways. In one example, an erosion resistant article is formed by cladding a substrate with tiles made of polycrystalline diamond or cubic boron nitride. These tiles may be made entirely of such polycrystalline material or have a surface layer of polycrystalline material with a backing of cemented tungsten carbide. It has been found in practice, however, that with tile-based cladding, erosion may work its way between the tiles until they detach from the substrate, leaving it exposed. Thus, if a washpipe seal ring, or any other similar component, were to be formed by mating pieces of superhard material into a single part then precaution may need to be taken to prevent erosion from working its way between these pieces.

For example, FIGS. 2-1 and 2-2 show embodiments of seal rings 212-1, 212-2 each comprising a hollow disk 220-1, 220-2 with a circular channel formed on one side thereof. A plurality of erosion-resistant tiles 221-1, 221-2 may be secured within this channel, protruding slightly therefrom. In various embodiments, such erosion-resistant tiles may be held in place via any number of common processes such as by press fit, shrink fit, epoxy or braze. The hollow disk 220-1, 220-2 may be formed of tungsten carbide while the erosion-resistant tiles 221-1, 221-2 may comprise either monolithic superhard material or superhard material sintered to tungsten carbide. If such a seal ring 212-1, 212-2 were to be used in a washpipe seal assembly of the type described previously, an abrasive fluid 222-2, as shown in FIG. 2-2, may pass under high pressure through a center of the hollow disk 220-1, 220-2 with a tendency to leak outward.

If ends of the erosion-resistant tiles 221-1, 221-2 are aligned with this leaking flow as shown, then the abrasive fluid 222-2 may begin to erode its way between adjacent ends of these tiles 221-1, 221-2. For example, FIGS. 2-3 and 2-4 show embodiments of two mating erosion-resistant tiles 221-3, 221-4 with straight ends. As abrasive fluid 222-3, 222-4 flows generally parallel to these ends, a gap may form between the tiles 221-3, 221-4 due to erosion.

Such assemblies may also be used as bearings for use downhole. For example, U.S. Pat. No. 5,364,192 is directed to a diamond thrust bearing assembly for a downhole motor. Such a structure includes mating bearings, each of which contains PCD compacts secured to a support element. For example, the bearing assembly may include a first bearing having a plurality of annular tiles fixed to a support structure, similar to those shown in FIGS. 2-1 and 2-2 of the present application, and a second bearing having a plurality of circular PCD compacts affixed to a second support structure.

BRIEF DESCRIPTION

In some embodiments, ends of at least two adjacent of the tiles may form a tortuous path therebetween. For example, a tortuous path may be created between ends of adjacent tiles by one of the tiles forming a protrusion extending therefrom and another of the tiles forming a cavity receding therein. Both protrusion and cavity may be shaped such that the protrusion fits snugly within the cavity.

This summary is provided to introduce a selection of concepts that are further described below in the detailed description. This summary is not intended to identify key or essential features of the claimed subject matter, nor is it intended to be used as an aid in limiting the scope of the claimed subject matter.

DRAWINGS

For a more complete understanding of the disclosed subject matter, and advantages thereof, reference is now made to the following descriptions taken in conjunction with the accompanying drawings, in which:

FIG. 2-1 is a perspective view and FIG. 2-2 is an orthogonal view of embodiments of a disk with a plurality of tiles secured thereto. FIG. 2-3 is a perspective view and FIG. 2-4 is an orthogonal view of embodiments of two mating tiles;

FIG. 3-1 is an orthogonal view of an embodiment of a disk with a plurality of tiles secured thereto, each tile forming a tortuous path with adjacent tiles. FIG. 3-2 is a perspective view of an embodiment of two mating tiles forming a tortuous path therebetween;

Figure 1:
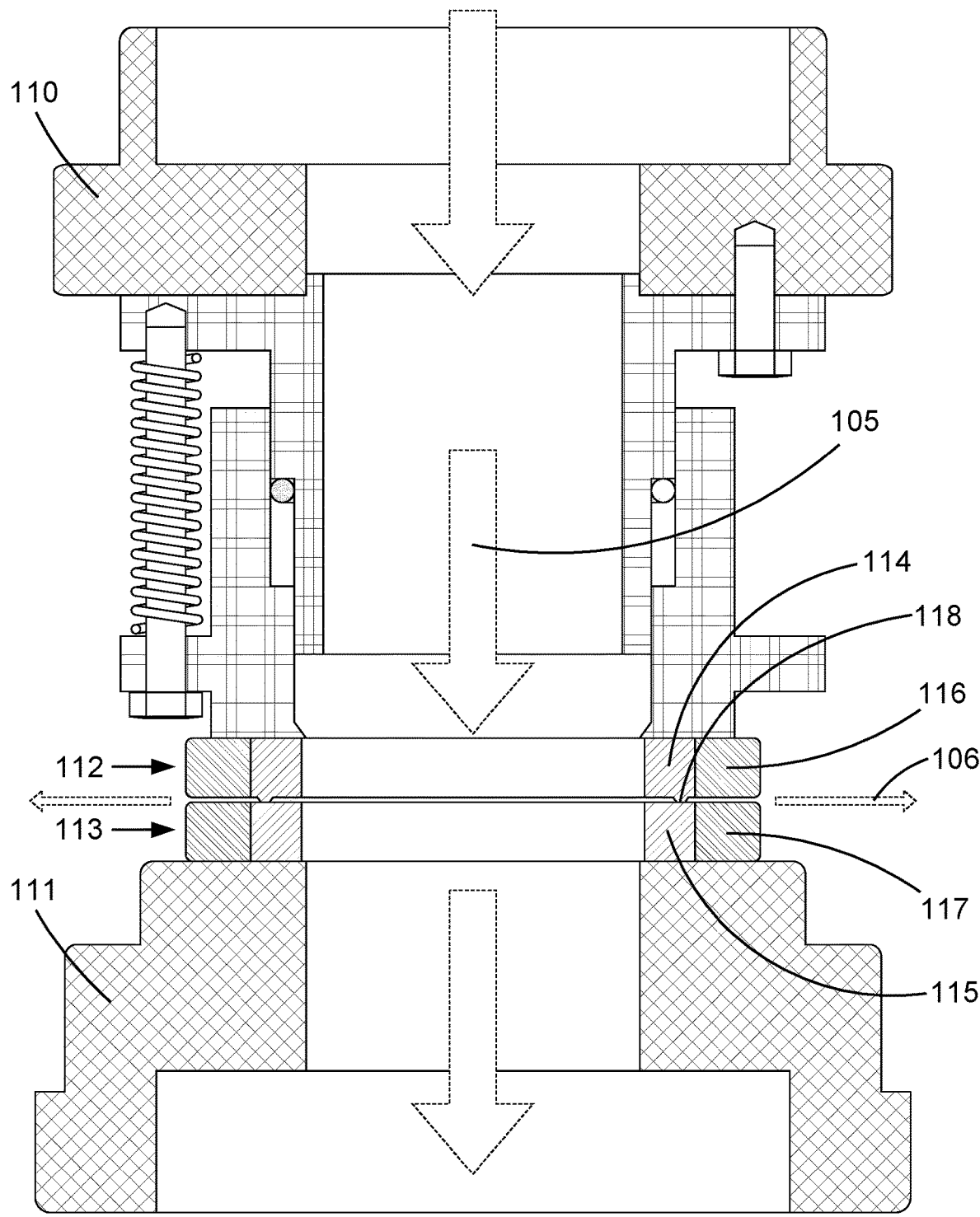
FIG. 1 is a longitude-sectional view of an embodiment of a washpipe seal assembly of the prior art.
Figures 1, 3:
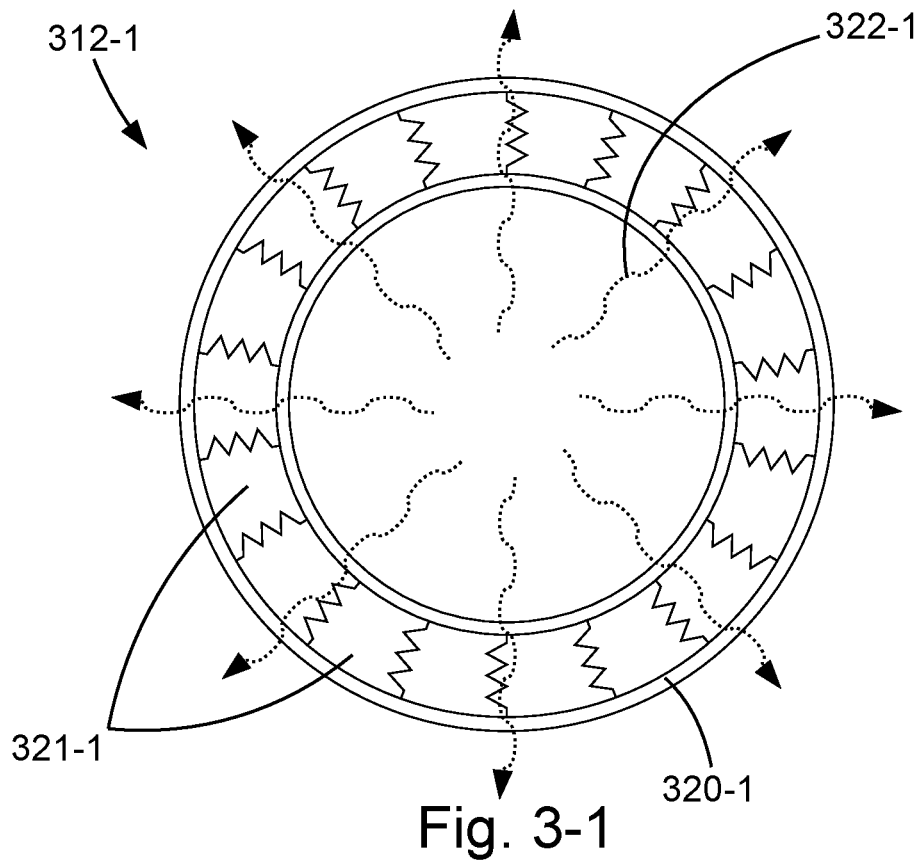
Figures 2, 3:
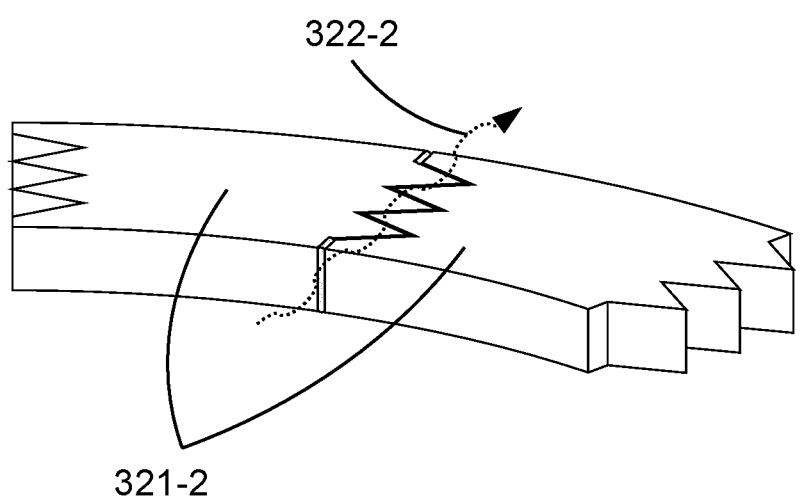
Figures 1, 4:
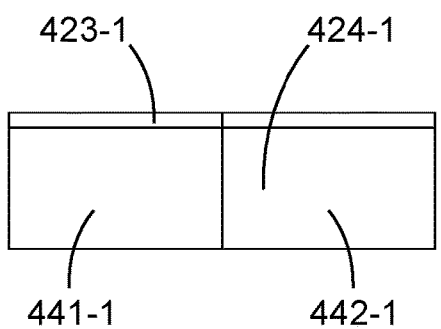
Figures 2, 4:
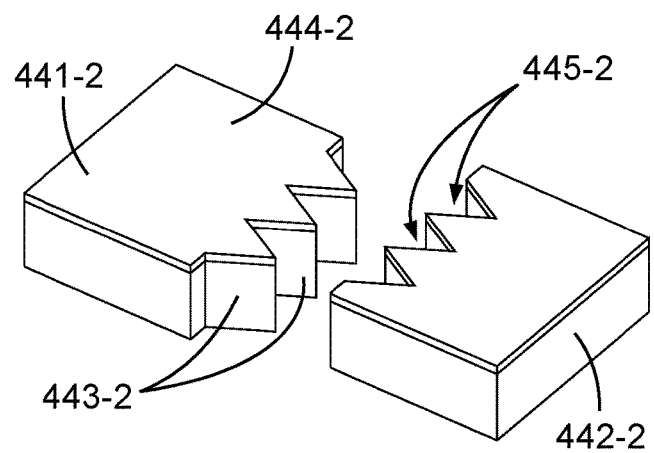
Figures 3, 4:
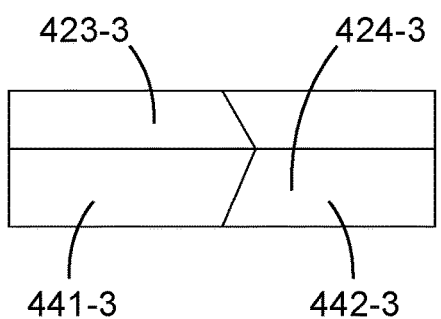
Figure 4:
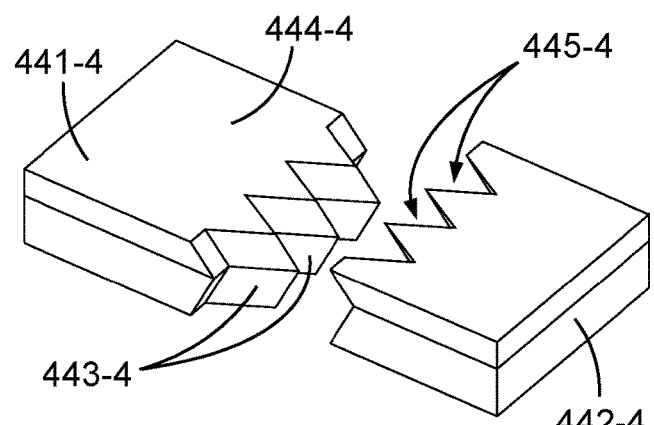
Figures 4, 5:
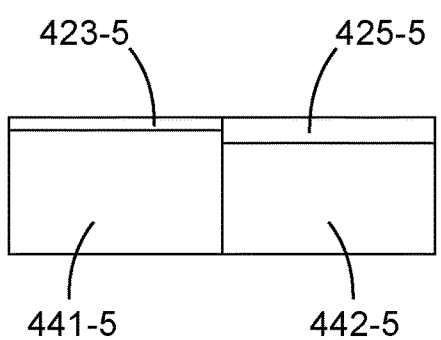

FIGS. 4-1, 4-3 and 4-5 are orthogonal views and FIGS. 4-2, 4-4 and 4-6 are exploded perspective views of embodiments of mating tiles; and FIGS. 5-1, 5-3 and 5-5 are orthogonal views and FIGS. 5-2, 5-4 and 5-6 are exploded perspective views of embodiments of mating tiles.

DETAILED DESCRIPTION

In some embodiments, a downhole tool (such as a washpipe seal or a bearing) includes adjacent tiles that form tortuous paths therebetween. In some embodiments, a tortuous path between adjacent tiles prevents or reduces damage caused by fluids getting between the tiles.

FIG. 3-1 shows an embodiment of a body or ring 312-1 having a disk 320-1 with a circular channel formed on one side thereof. A plurality of tiles 321-1 (e.g., erosion resistant tiles) may be secured within this channel and protrude therefrom to form a continuous external surface. The surface could be a bearing surface and/or a sealing surface. In some embodiments, the disk is a hollow disk formed of tungsten carbide, and the tiles 321-1 are formed of monolithic superhard material (e.g., polycrystalline diamond, other forms of diamond or diamond composites, polycrystalline boron nitride, another suitable superhard material, or combinations thereof). In some embodiments, the disk may be formed of steel or any suitable material. In some embodiments, the tiles may be polycrystalline diamond compacts (PDCs) where polycrystalline diamond is fixed to a tungsten carbide base. However other configurations are also contemplated, and any suitable materials may be used for the support structure (e.g., disk) and tiles. Ends of each of these tiles 321-1 may have geometries forming tortuous paths between themselves and adjacent tiles 321-1. In some embodiments, if an abrasive fluid 322-1 were to flow past the interfaces between these tiles 321-1, these tortuous paths may slow the abrasive fluid progress, thus reducing or preventing erosion between the tiles 321-1.

For instance, FIG. 3-2 shows an embodiment of two mating erosion-resistant tiles 321-2. As abrasive fluid 322-2 flows along an interface between the tiles 321-2 it may be hindered by a tortuous path formed therebetween. This hinderance may slow the flow, thus reducing the speed at which the abrasive fluid 322-2 causes erosion. In some embodiments, tortuous paths between mating tiles may hinder fluid flow through gaps formed between abutting superhard materials that may experience difficulty attaching to braze material, microchannels that may form through the braze material itself as it cools, and microchannels that may form when transitioning between machining superhard material and tungsten carbide.

FIGS. 4-1 and 4-2 show embodiments of two mating tiles 441-1, 441-2 and 442-1, 442-2. Each of the tiles 441-1, 441-2, 442-1, 442-2 may include a superhard material 423-1 sintered to tungsten carbide 424-1, e.g., a polycrystalline diamond compact (polycrystalline diamond secured to a tungsten carbide substrate). In some embodiments, the tungsten carbide 424-1 may have a thickness about ten times greater than a thickness of the superhard material 423-1. However, alternate embodiments may exhibit different ratios. For example, the tungsten carbide thickness to superhard material thickness may be in a ratio range having an upper value, a lower value, or upper and lower values including any of 15:1, 10:1, 8:1, 5:1, 4:1, 3:1, 2:1, or 1:1. For example, the tungsten carbide thickness to superhard material thickness may be in a ratio ranging from 15:1 to 1:1, from 10:1 to 2:1, from 8:1 to 3:1, or any suitable ratio.

As visible in FIG. 4-2, a first tile 441-2 may have a plurality of protrusions 443-2 extending from an end thereof facing an adjacent second tile 442-2. The protrusions 443-2 may be received within a plurality of cavities 445-2 in an end of the second tile 442-2 facing the first tile 441-2. The combination of protrusions 443-2 and cavities 445-2 may create a tortuous path between the first tile 441-2 and second tile 442-2 in a direction from one side of the tiles to the second side of the tiles. In some embodiments, this design may reduce erosion sufficiently in many applications and may be machined by various common techniques such as wire electrical discharge machining. However, such an arrangement may not create a tortuous path perpendicular to the top surface 444-2, e.g., in a direction from the top to the bottom of the tiles.

FIGS. 4-3 and 4-4 show embodiments of two mating tiles 441-3, 441-4 and 442-3, 442-4 having respective end geometries that together form a complex tortuous path therebetween (e.g., multiple tortuous paths therebetween). Specifically, as visible in FIG. 4-4, the first tile 441-4 may have a plurality of protrusions 443-4 extending from an end thereof and the second tile 442-4 may include a plurality of cavities 445-4 to receive these protrusions 443-4. In this embodiment, these tortuous paths may run between a first tile 441-4 and a second tile 442-4 in directions both generally parallel and generally perpendicular to the top surfaces 444-4 thereof. That is, the tortuous paths may run both from top to bottom of the tiles and side to side of the tiles. Additionally, in the depicted embodiment, a thickness of a superhard material 423-3 of the tiles 441-3, 441-4, 442-3, 442-4 may be nearly equal to a thickness of the substrate (e.g., tungsten carbide) 424-3 of the tiles 441-3, 441-4, 442-3, 442-4.

Figures 4, 5, 6:
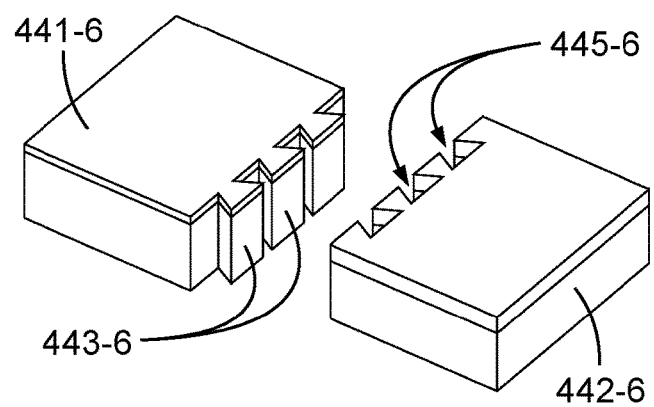
Figures 1, 5:
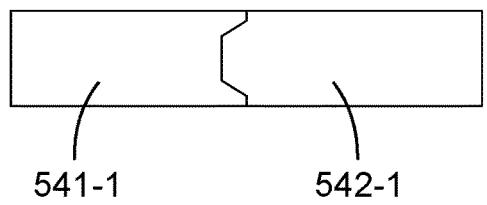
Figures 2, 5:
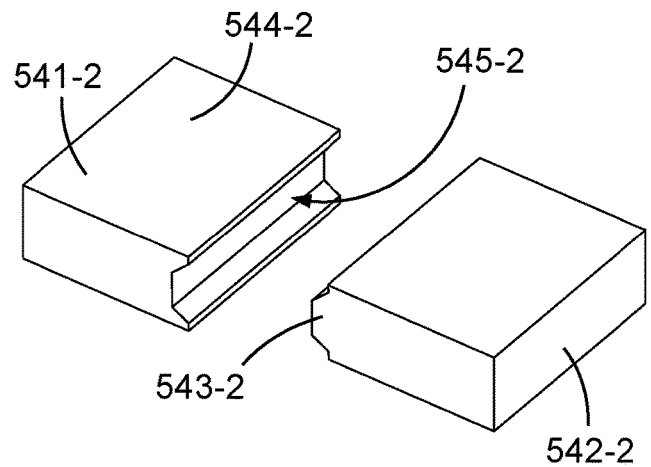
Figures 3, 5:
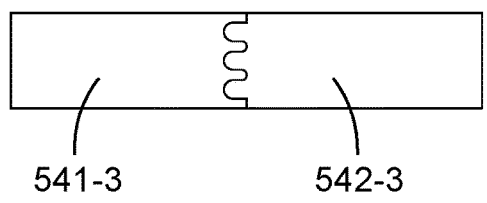
Figures 4, 5:
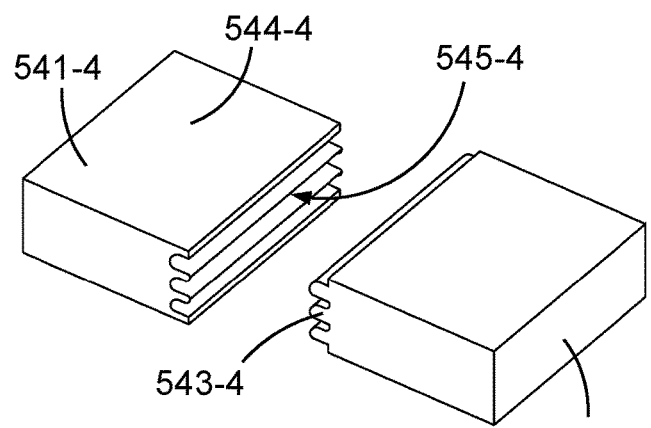
Figure 5:
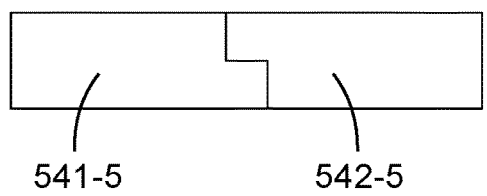
Figures 5, 6:
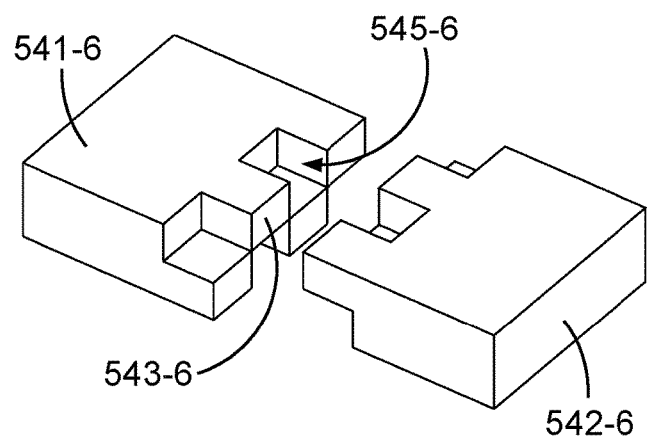

FIGS. 4-5 and 4-6 show embodiments of mating tiles 441-5, 441-6 and 442-5, 442-6. As visible in FIG. 4-6, a first tile 441-6 may have a plurality of protrusions 443-6 while a second tile 442-6 have a plurality of cavities 445-6 capable of receiving the protrusions 443-6. In this embodiment, the protrusions 443-6 and cavities 445-6 have interlocking geometries such that when mated together they may hold the tiles 441-6, 442-6 in place relative to each other. Additionally, in this embodiment, a thickness of a superhard material 423-5 of a first tile 441-5 may be different than a thickness of a superhard material 425-5 of a second tile 442-5. Similarly, a thickness of the substrate of the first tile may be different than a thickness of the substrate of the second tile. In some embodiments, this difference may help to offset microchannels formed when transitioning between superhard and other materials.

FIGS. 5-1 and 5-2 show embodiments of two mating tiles 541-1, 541-2 and 542-1, 542-2 having respective end geometries that together form a tortuous path in a direction generally perpendicular to the top surfaces 544-2 thereof. However, in such an embodiment, a tortuous path does not exist from one side of the tiles to the other side of the tiles. Specifically, a first tile 541-1, 541-2 has a single cavity 545-2, receding into an end thereof, capable of snugly receiving a single protrusion 543-2, extending from an end of a second tile 542-1, 542-2. This cavity 545-2 and protrusion 543-2 may overlap an external surface of any body (e.g., bearing race) to which the tiles 541-1, 541-2, 542-1, 542-2 may be attached. In some embodiments, this design may reduce erosion sufficiently in many applications and may be machined by various common techniques such as wire electrical discharge machining.

FIGS. 5-3 and 5-4 show embodiments of two mating tiles 541-3, 541-4 and 542-3, 542-4. In this embodiment, the mating tiles 541-3, 541-4 and 542-3, 542-4 have a plurality of cavities 545-4 and a plurality of protrusions 543-4 respectively. These cavities 545-4 and protrusions 543-4 may act together to form a more complex tortuous path in a direction generally perpendicular to top surfaces 544-4 of the tiles 541-3, 541-4, 542-3, 542-4 (e.g., in a direction from a top surface to a bottom surface of the tiles). In some embodiments, this more complex design may need to be machined by a more complex technique, such as laser beam machining.

FIGS. 5-5 and 5-6 show embodiments of two mating tiles 541-5, 541-6 and 542-5, 542-6. In this embodiment, each of the tiles 541-5, 541-6, 542-5, 542-6 include both protrusions 543-6 extending from and cavities 545-6 receding into ends thereof. These protrusions 543-6 and cavities 545-6 may mate with each other to form complex tortuous paths (e.g., a complex tortuous path in a direction from a top surface to a bottom surface of the tiles as well as in a direction from a first side to a second side of the tiles).

As noted above, such structures can also be used for bearings, e.g., bearings for use in downhole tools. For example, the disclosed embodiments may be used to form a thrust bearing assembly or a radial bearing assembly. In some embodiments, a downhole bearing assembly includes mating bearings, each of which contains polycrystalline diamond compacts (e.g., polycrystalline diamond formed adjacent to tungsten carbide) secured to a support element such as a bearing race made of any suitable material, e.g., steel or other metal or alloy or harder materials such as tungsten carbide. For example, the bearing assembly may include a first bearing having a plurality of annular tiles fixed to a support structure, similar to those described above and shown in FIGS. 3-1 to 5-6 of the present application. The tiles may be monolithic hard materials or may be polycrystalline diamond compacts or other suitable hard materials. The bearing assembly may include a second bearing having a plurality of circular polycrystalline diamond compacts or other hard material affixed to a second support structure. The bearing assemblies could be structured to be thrust bearings, radial bearings, or a combination of thrust bearings and radial bearings (e.g., the bearings could be slanted at an angle with respect to a tool axis).

Although interlocking tiles for downhole tools have been described in detail, it should be understood that various changes, substitutions and alternations can be made herein without departing from the spirit and scope of the disclosure as defined by the appended claims. These described embodiments are examples of the presently disclosed techniques. In an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. Terms such as up, down, top and bottom, first side, and second side, and other like terms should be understood to be relative positions to a given point and may be utilized to more clearly describe some features. Commonly, these terms relate to a reference point such as the surface from which drilling operations are initiated.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, or within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. Although only a few example embodiments have been described in detail above, those skilled in the art will readily appreciate that many modifications are possible in the example embodiments without materially departing from this invention. Accordingly, all such modifications are intended to be included within the scope of this disclosure.

The invention claimed is:

1. A downhole tool, comprising:
a first tile, the first tile having a top surface, a bottom surface, a first side surface, and a second side surface;
a second tile adjacent to the first tile, the second tile having a top surface, a bottom surface, a first side surface, and a second side surface;
the first tile comprising a first interface end facing the second tile;
the second tile comprising a second interface end facing the first tile; and
the first interface end and second interface end together forming a first tortuous path therebetween in a first direction perpendicular to the top surfaces of the first tile and the second tile, wherein the top surfaces form bearing surfaces or sealing surfaces of the downhole tool.

2. The downhole tool of claim 1, wherein the first interface end and second interface end together form a second tortuous path in a second direction perpendicular to the first side surfaces of the first and second tiles.

3. The downhole tool of claim 1, wherein the first tortuous path comprises a plurality of cavities and protrusions.

4. The downhole tool of claim 3, wherein the first interface end and second interface end together form a second tortuous path in a second direction perpendicular to the first side surfaces of the first and second tiles.

5. The downhole tool of claim 1, wherein the first interface end comprises a protrusion extending therefrom.

6. The downhole tool of claim 1, wherein the second interface end comprises a cavity receding therein.

7. The downhole tool of claim 6, wherein the cavity receives a protrusion extending from the first interface end tightly therein.

8. The downhole tool of claim 1, wherein both the first tile and second tile comprise a material exhibiting a Vickers hardness test result exceeding 40 gigapascals.

9. The downhole tool of claim 8, wherein both the first tile and second tile comprise a second material bonded to the material exhibiting a Vickers hardness test result exceeding 40 gigapascals.

10. The downhole tool of claim 1, wherein the top surface of the first tile is continuous with the top surface of the second tile.

11. The downhole tool of claim 1, wherein both the first tile and second tile are secured to an external surface of a body.

12. The downhole tool of claim 11, wherein the first interface end and the second interface end overlap the external surface of the body.

13. The downhole tool of claim 1, the first tile comprising a third interface end opposite the first interface end, the tool further comprising a third tile comprising a fourth interface end, wherein an interface between the third interface end and the fourth interface end forms a tortuous path between the first tile and the third tile.

14. A downhole bearing, the downhole bearing comprising:
a first bearing race;
a first polycrystalline diamond compact (PDC) secured to the first bearing race, the first PDC having a polycrystalline diamond (PCD) layer having a top surface, a tungsten carbide layer fixed to the PCD layer having a bottom surface, a first side surface, a second side surface, and a first interface end;
a second PDC secured to the first bearing race adjacent the first PDC, the second PDC having a PCD layer having a top surface, a tungsten carbide layer fixed to the PCD layer having a bottom surface, a first side surface, a second side surface, and a second interface end; and
the first interface end of the first PDC and the second interface end of the second PDC together forming a first tortuous path therebetween in a first direction perpendicular to the top surfaces of the first PDC and the second PDC.

15. The bearing of claim 14, wherein the first interface end and the second interface end together form a second tortuous path in a second direction perpendicular to the first side surface of the first and second PDCs.

16. The bearing of claim 14, wherein the first tortuous path comprises a plurality of cavities and protrusions.

17. The bearing of claim 16, wherein the first interface end and second interface end together form a second tortuous path in a second direction perpendicular to the first side surfaces of the first and second PDCs.

18. The bearing of claim 14, wherein the first PDC has a PCD thickness and a tungsten carbide thickness, and a ratio of the tungsten carbide thickness to PCD thickness may be in a ratio ranging from 10:1 to 1:1.

19. The bearing of claim 14, wherein the first PDC has a first PCD thickness and the second PDC has a second PCD thickness and the first PCD thickness is greater than the second PCD thickness.

20. The bearing of claim 14, wherein the top surface of the first PDC is continuous with the top surface of the second PDC.

* * * * *